Jan. 30, 1945.  K. ZWICK  2,368,342
TOOL GRINDING MACHINE
Filed March 6, 1941  2 Sheets-Sheet 1

Inventor
Kurt Zwick
By
Dumpston & Shepard
his Attorneys.

Patented Jan. 30, 1945

2,368,342

UNITED STATES PATENT OFFICE 2,368,342

TOOL GRINDING MACHINE

Kurt Zwick, Munich, Germany; vested in the Alien Property Custodian

Application March 6, 1941, Serial No. 382,051
In Germany January 19, 1940

7 Claims. (Cl. 51—219)

This invention relates to a grinding machine particularly adapted for grinding the relieved or backing-off surfaces of rotary tools having helical cutting edges, such as drills, milling cutters, or the like, as well as grinding the helical cutting edges of such tools, although capable also of other uses.

In many modern types of rotary cutting, milling, or drilling tools, there are helical, or approximately helical, cutting edges, and the material of the tool behind each such cutting edge should be relieved or backed-off, that is, should be so formed as to provide a clearance, behind the cutting edge, between the tool and the side or wall of the material being milled, drilled, or cut. Heretofore, the usual practice has been to grind the helical cutting edge on one machine and then to transfer the tool to a second machine, such as a backing-off lathe, to form and finish the desired relieved surface behind the helical cutting edge.

An object of the present invention is to provide, in a single machine, efficient means for grinding both the helical cutting edge and the relieved surface behind the helical cutting edge.

Another object is to provide such a machine so designed and constructed that the tool may have both types of grinding operations successively performed upon it while the tool remains clamped in the machine, without the necessity for removing the tool and replacing it in a different position.

Still another object is the provision of a machine capable of rapid and efficient grinding of helically extending bands or surfaces which are to be relieved or tapered in a circumferential direction.

A further object is the provision of a machine for grinding helically extending bands or strips which are to be relieved or tapered in a circumferential direction, so designed and constructed that the grinding may proceed, at will, either by a series of operations each extending circumferentially with respect to the part being ground, or by a series of operations each extending helically with respect to the part being ground.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

Figure 1:
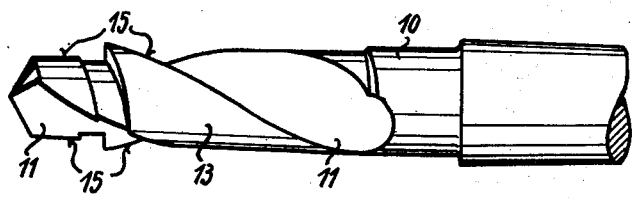
Fig. 1 is a side view of a typical form of tool which may be ground by a machine of the present invention.

Referring first to Fig. 1 of the drawings, there is shown, as a typical example of the work which may be ground by the machine of the present invention, a twist drill 10 of the step type, the drill being provided with helical grooves 11 having helical cutting edges 15, behind which the surfaces 13 are relieved or tapered or backed-off in a circumferential direction; that is, the radius of each surface 13 decreases in a circumferential direction from the cutting edge 15 backwardly toward the next succeeding groove 11.

The machine of the present invention is designed to grind both the helical cutting edges 15 and the relieved surfaces 13, upon a single clamping of the tool in the machine, without the need for unclamping the tool until the job is finished. Furthermore, the machine of the present invention is designed to grind the surfaces 13 either by traversing the grinding wheel over the tool 10 in a helical direction (approximately parallel to the edges 15) or in a circumferential direction, as may be desired.

Figure 2:
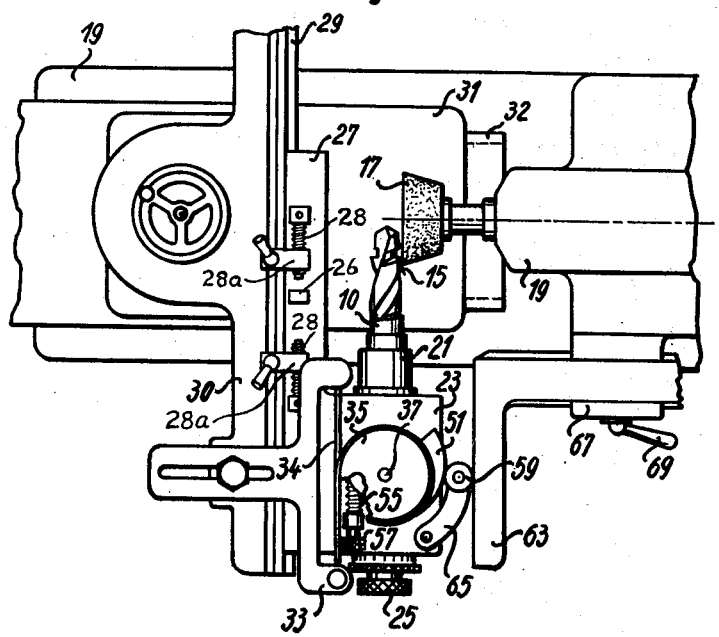
Fig. 2 is a plan of a machine constructed in accordance with one embodiment of the present invention.

Referring now to Fig. 2 of the drawings, there is shown somewhat diagrammatically a machine in accordance with a preferred embodiment of the present invention, various details being omitted from the drawings, for the sake of simplicity and clarity. The machine comprises any suitable grinding tool such as the grinding wheel 17 driven or rotated in any suitable manner and mounted on the machine frame 19. The tool 10 which is to be ground on the machine is fastened in any suitable chuck, holder, or clamping device on the end of a hollow shaft 21 rotatably journaled in a housing 23 and provided with a knob 25 by which the shaft 21 and the work 10 may be turned by hand. The housing 23 forms part of a slide or carriage 27 movable in a horizontal direction along the guideway 29 formed on the member 30. This member 30, in turn, is supported on a slide 31 movable along a horizontal guideway 32 which is approximately at right angles to the direction of the guideway 29 on the machine frame 19.

Mounted on the member 30 is a yoke 33 adjustable or displaceable in a horizontal direction perpendicular to the direction of the guideway 29. Mounted on this yoke 33 is a flexible band 34 held taut or under tension and wrapped around a smooth band-engaging periphery of a wheel 35 removably mounted on the upper end of the shaft 37 connected to a bevelled sun gear 39 (Fig. 3) meshing with a pair of planetary gears 40 which mesh also with a second sun gear 41 on the upper end of a shaft 43 journaled in the housing 23 and carrying at its lower end a bevelled gear 45 meshing with a bevelled gear 47 on the hollow shaft 21. The gears 39, 40, and 41 together constitute a differential or planetary transmission, the gears 40 being on stub shafts mounted on a housing 49 which is rotatable on the housing 23.

Figure 3:
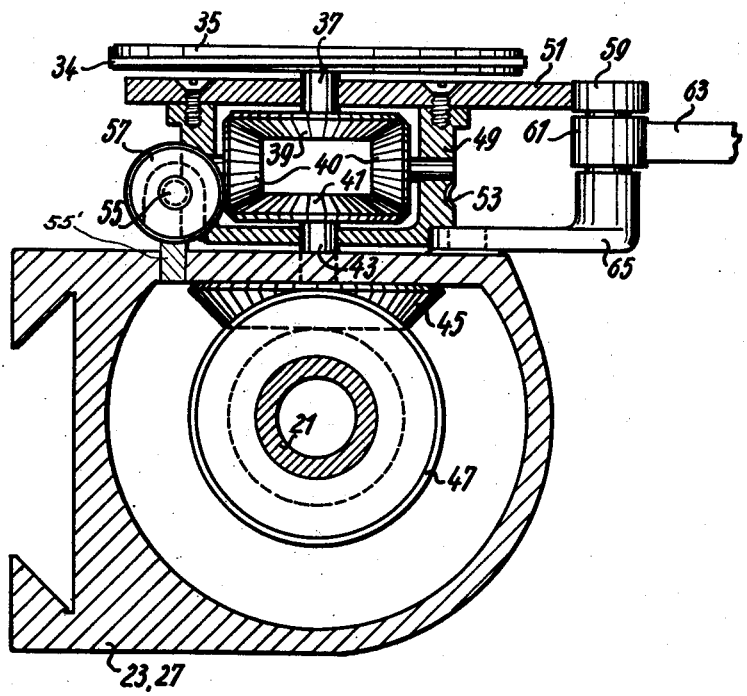
Fig. 3 is a vertical section through a portion of the machine shown in Fig. 2.

A cam 51 (Figs. 2 and 3) is removably secured to the top of the housing 49 to rotate therewith. For example, the cam 51 may be held to the housing 49 by screws, as shown in Fig. 3, and when the disk or wheel 35 is removed from the top of the shaft 37, the screws may be removed to permit removal of the cam 51 so that it may be replaced by another cam of different shape.

Extending circumferentially around the periphery of the housing 49 are worm gearing teeth 53 so that the housing itself constitutes a worm gear. A worm 55 is journaled in a post 55' journaled in the top of the housing 23 and may be swung against and into mesh with the worm gear teeth 53, or may be swung laterally away from and out of mesh with such teeth. A knob 57 is connected with worm 55, so that the latter may be turned by hand.

Two small rollers 59 and 61 are mounted on a common stub shaft or axle on an arm 65 swingably mounted on the top of the housing 23 for oscillation in a horizontal plane. The roller 59 rolls against the periphery of the cam 51, while the roller 61 rolls on a track 63 adjustably mounted on the machine frame 19, the supporting arm of the track being slidable in a guideway 67 extending parallel to the axis of rotation of the grinding wheel 17, and being clamped in any desired position along such guideway by means of a clamping device 69.

The lateral advancement of the tool 10 toward the grinding wheel 17 (in a direction along the guideway 32) may be controlled by the cam 51, rollers 59 and 61, and track 63. Since the track 63 is unyielding and since the rollers 59 and 61 are unyielding with respect to each other (except for their ability to rotate) it follows that hand pressure or other suitable pressure may be applied to tend to move the parts 31, 30, 27, and 23 in a direction along the guideway 32, to the right when viewed as in Figs. 2 and 3, and the extent of motion in this direction will be limited by engagement of the cam surface 51 with the roller 59 while the companion roller 61 engages the track 63. If a relatively high point of the cam 51 be brought opposite the roller 59, this will keep the axis of the tool 10 farther away from the face of the grinding wheel 17, while if a lower point of the cam 51 be brought opposite the roller 59, the axis of the tool 10 may move closer to the grinding wheel 17.

The tool 10 is capable of three different movements with respect to the grinding wheel 17. First, there is the movement just described, a lateral movement of the axis of the tool 10, in the direction of the guideway 32. Second, the tool 10 may be moved axially or longitudinally by moving the housing 23 and slide 27 bodily along the guideway 29. Third, the tool 10 may be rotated about its own longitudinal axis, by turning the shaft 21. In any given single step of a grinding operation, either one of the first two mentioned movements is eliminated for the time being, and the other one of said first two mentioned movements is correlated or synchronized with the third or rotary movement, by the mechanism of the present invention.

From the known properties of a planetary gear transmission such as above described, it follows that if the wheel 35 and gear 39 are held stationary, and if the housing 49 is allowed to rotate, rotation imparted to the gear 41 will cause the planetary gears 40 to roll on the gear 39 and will turn the housing 49 in which the shafts of the planetary gears 40 are mounted. On the other hand, if the housing 49 be held against rotation and if the wheel 35 be permitted to revolve, then rotary motion imparted to the gear 39 will cause rotation of the planetary gears 40 about axes which are fixed for the time being, so that the gear 41 will be turned through an amount equal to the turning of the gear 39, but in the opposite direction.

The operation of the machine in grinding the cutting edge 15 is as follows: The tool 10 is clamped in the chuck or holder on the end of the shaft 21. By suitable adjustments of the slides 27, 30, and 31 along their respective guideways, the proper portion of the grinding wheel 17 is brought against the face of the spiral groove 11 adjacent one end of the cutting edge 15 which is to be ground. Fine adjustment in a rotary direction may be obtained by turning the knob 57 of the worm 55 while this worm is engaged with the teeth 53.

The housing 23 and slide 27 are now moved bodily along the guideway 29, preferably by hand pressure. This causes the tool 10 to be moved longitudinally or axially past the grinding wheel 17. At the same time, the wheel 35 is moved along the stationary track band 34 to roll therealong and is caused to turn thereby. The worm 55 prevents the housing 49 from turning, so that the rotation of the wheel 35 and the gear 39 causes the gear 41 to turn through an equal amount, and this motion is transmitted through the gears 45 and 47 to the shaft 21, causing this shaft to turn in synchronism with its axial advance, thus producing a helical motion of the tool 10 relatively to the grinding wheel 17, which enables the accurate grinding of the helical edge 15. To grind a helical edge with a different pitch or helical angle, the wheel 35 may be removed and replaced by a wheel of different diameter. The track bracket 33 may be adjusted in the direction of the slot shown in Fig. 2, so that the track band 34 will lie tangent to a wheel 35 of any desired diameter.

The operation of the machine in grinding the surface 13 by the helical method is as follows: The tool 10 is clamped on the shaft 21, or if the tool has previously been mounted in the machine for the purpose of grinding the edge 15, it remains clamped in the same position on the shaft 21. The tool is moved with respect to the grinding wheel 17, by suitable operation of the slides 27, 30, and 31, so that a suitable part of the grinding wheel 17 is in contact with the surface 13 just behind one end of the cutting edge 15. The track 63 is now adjusted so as to bear firmly against the roller 61 while the companion roller 59 bears against the cam 51 near a high portion thereof. Leaving the worm 55 in engagement with the gear teeth 53, the carriage 27 is now advanced along its guideway 29 by hand pressure in an upward direction when viewed as in Fig. 2, at the same time pressing to the right to keep the cam 51 against the roller 59 and the roller 61 against the track 63, which determines the distance between the axis of the tool 10 and the face of the grinding wheel. This motion carries the surface 13 past the grinding wheel 17. In the same manner as when grinding the cutting edge 15, the wheel 35 turns by rolling on the track band 34, which causes rotation of the shaft 21 in synchronism with the longitudinal movements thereof, so that the grinding wheel 17 grinds a helical band or strip of the surface 13 just behind the cutting edge 15, and approximately parallel therewith.

When the full length of this helical band or strip has been ground, the carriage 27 is returned to its initial position. Now the knob 57 is turned to rotate the worm 55 so that, by its engagement with the gear teeth 53, the housing 49 and cam 51 will be slightly rotated. The wheel 35 is held against rotation at this time by reason of its engagement with the band 34, and consequently the rotation of the housing 49 causes a rotation of the shaft 21, turning the tool 10 (without any longitudinal advance thereof) to bring the grinding wheel 17 into engagement with a portion of the surface 13 a little farther away from the edge 15 than the strip or band which has just been ground. At the same time, the cam 51 turns with the housing 49 and presents a somewhat lower portion of the cam opposite the roller 59, so that the housing 23 and the slides 27, 30, and 31 are permitted to move along the guideway 32 in a direction a little closer to the grinding wheel 17.

In the second step of the grinding operation, the slide 27 is shoved by hand along the guideway 29, in an upward direction when viewed as in Fig. 2, at the same time applying pressure toward the right when viewed as in Fig. 2, as before. As the movement continues, the wheel 35 rolls on the track 34 as before, thus turning the tool 10 about its axis as before, with the result that a second helical band or strip of the surface 13 is presented to the grinding wheel 17. But this second helical band or strip has a somewhat less radius than the first helical band or strip, because the slight rotation of the cam 51 between the grinding of the first band and the grinding of the second band presents a lower point on the cam to the roller 59 and allows the housing 23 to move slightly closer to the track 63, thus permitting the axis of the tool 10 to move somewhat closer to the grinding wheel 17, so that the second band or strip of the surface 13 is ground to a slightly smaller radius than the first band.

To set the mechanism for the third grinding step, the knob 57 and the worm 55 are similarly turned after the completion of the grinding of the second band, to turn the cam 51 still farther and to permit the axis of the tool 10 to move still closer to the grinding wheel 17. The grinding of helical bands or strips of the surface 13 continues in this manner until the whole surface has been ground to the desired extent. Each succeeding band farther from the cutting edge 15 is of successively smaller radius, with the result that the surface 13 is relieved or radially backed off in the desired manner. The rate at which the radius of the surface 13 decreases in a circumferential direction away from the edge 15 is determined by the steepness or shape of the cam 51, which may be removed and replaced by a different cam having a steeper or a less steep edge, when different characteristics of the surface 13 are desired, or a single cam 51 may have different portions of its periphery formed with a different rise or steepness, any selected portion being used as desired, in a manner analogous to the use of a selected portion of the periphery of the cam shown in my United States Patent 2,217,091, granted Oct. 8, 1940, for Feeding device for machine tools.

The operation of the machine in grinding the surface 13 by the circumferential method is as follows: The slides 27, 30, and 31 are adjusted as described at the beginning of the preceding method, to bring a suitable face of the grinding wheel 17 in contact with the surface 13 just behind one end of the cutting edge 15. The slide 27 is now clamped in the guideway 29 to prevent longitudinal movement, and the track 63 is adjusted as before to bear against the roller 61 while the roller 59 bears against the cam 51. Now the shaft 21 is turned, preferably by grasping and turning the knob 25, first swinging the worm 55 out of mesh with the gear teeth 53 on the housing 49. At the same time that the shaft is turned, hand pressure is applied on the parts 23, 27, 30, and 31 to tend to move them in a direction toward the grinding wheel 17, along the guideway 32. Since the wheel 35 is held against turning by the stationary track band 34, rotation of the shaft 21 is accompanied by rotation of the housing 49 and cam 51. As the shaft 21 turns to cause the grinding wheel 17 to cooperate with successive points on the surface 13 spaced progressively farther and farther from the cutting edge 15 in a circumferential direction, the cam 51 also turns to bring progressively lower points thereof opposite the roller 59, so that the pressure applied rightwardly to the parts permits the axis of the tool 10 to move progressively closer to the wheel 17, producing the desired progressive decrease in radius or relieved effect in that part of the surface 13 which is being ground.

After completing the grinding of one band or strip extending circumferentially from the cutting edge 15 to the next helical groove 11, the parts are returned to initial position and the worm 55 is swung into engagement with the teeth 53 to lock the housing 49 against turning. Then the slide 27 is moved a slight distance along its guideway 29, to bring the next succeeding circumferential band or strip opposite the grinding wheel. Then the slide 27 is clamped, the worm 55 is swung away from the teeth 53, and the grinding operation is repeated by turning the knob 25 to grind the next circumferential band or strip. After each succeeding band or strip has been ground, another slight movement of the slide 27 takes place. During such movement, the wheel 35 rolls on the track 34 to cause a slight turning of the tool 10 so that the grinding operation performed on each band or strip will be a little farther around the tool, in a circumferential direction, than the preceding band or strip, in accordance with the helical characteristics of the tool.

The turning of the shaft 21 in carrying out any one step of the circumferential grinding method is preferably accomplished by directly grasping and turning the knob 25, as above stated; but if desired, the worm 55 may be swung into engagement with the gear teeth 53 and the knob 57 may be turned to cause the turning of the shaft 21.

Although it is possible, as above explained, to grind the relieved surface 13 in successive strips or bands each extending in a circumferential direction, yet it is preferred to grind this surface by the method earlier described, where each of the grinding steps produces a band or strip extending helically. This method results in a better cutting edge than the circumferential grinding method, because each side of the corner between the surfaces 13 and 11 is formed by a single longitudinal grinding operation, instead of one side of the corner being formed by a series of lateral grinding operations. Also it is faster because there are fewer steps required in grinding the complete surface, resulting in fewer settings or indexing operations between steps, and faster for the further reason that only one or two of the helical strips nearest the cutting edge 15 need be ground with the greatest accuracy, and the succeeding helical strips farther from the cutting edge 15 can be ground more rapidly and with less accuracy, since there is a greater clearance between these and the side wall of the hole or bore which the tool is intended to drill.

While one embodiment of the invention has been disclosed, it is to be understood that the inventive idea may be carried out in a number of ways. This application is therefore not to be limited to the precise details described, but is intended to cover all variations and modifications thereof falling within the scope of the appended claims.

I claim:

1. A machine for grinding helically arranged and circumferentially relieved surfaces on tools having a rotary axis, said machine including a grinding wheel, means for holding a tool to be ground, means mounting said tool for movement relatively to said grinding wheel in a direction approximately axially of the tool, in a direction rotating around the axis of said tool, and also in a direction laterally of the axis of said tool to bring said axis closer to or farther away from said grinding wheel, a stationary track extending in a general direction approximately axially of the tool, rotary means carried by said tool mounting means, movable bodily with the approximately axial movements of the tool and rolling on said track to be turned thereby in response to said movements in a direction approximately axially of the tool, a second stationary track also extending in a general direction approximately axially of the tool, a second rotary means carried by said tool mounting means, movable bodily along said stationary track in the direction axially of the tool, and being thereby adjustably displaced in the direction laterally of the tool axis to control the movements of said tool in said direction laterally of the axis thereof, and means for coupling either of said rotary means at will to the rotary motion of said tool to cause the selected rotary means and the tool to turn in synchronism with each other.

2. A machine for grinding helically arranged and circumferentially relieved surfaces on tools having a rotary axis, said machine including a grinding wheel, means for holding a tool to be ground, means mounting said tool for movement relatively to said grinding wheel in a direction approximately axially of the tool, in a direction rotating around the axis of said tool, and also in a direction laterally of the axis of said tool to bring said axis closer to or farther away from said grinding wheel, a track extending in a general direction approximately axially of the tool, rotary means carried by said tool mounting means, movable bodily with the approximately axial movements of the tool and rolling on said track to be turned thereby in response to said movements in a direction approximately axially of the tool, a second stationary track also extending in a general direction approximately axially of the tool, a second rotary means carried by said tool mounting means, movable bodily along said stationary track in the direction axially of the tool, and being thereby adjustably displaced in the direction laterally of the tool axis to control the movements of said tool in said direction laterally of the axis thereof, and means including planetary gearing for selectively coupling either of said rotary means at will to the rotary motion of said tool to cause the selected rotary means and the tool to turn in synchronism with each other.

3. A machine for grinding helically arranged and circumferentially relieved surfaces on tools having a rotary axis, said machine including a grinding wheel, means for holding a tool to be ground, means mounting said tool for movement relatively to said grinding wheel in a direction approximately axially of the tool, in a direction rotating around the axis of said tool, and also in a direction laterally of the axis of said tool to bring said axis closer to or farther away from said grinding wheel, a track extending in a general direction approximately axially of the tool, rotary means carried by said tool mounting means, movable bodily with the approximately axial movements of the tool and rolling on said track to be turned thereby in response to said movements in a direction approximately axially of the tool, a second stationary track also extending in a general direction approximately axially of the tool, a second rotary means carried by said tool mounting means, movable bodily along said stationary track in the direction axially of the tool, and being thereby adjustably displaced in the direction laterally of the tool axis to control the movements of said tool in said direction laterally of the axis thereof, planetary gearing including three interengaged parts movable with respect to each other, means coupling one of said movable parts to said first mentioned rotary means to turn therewith, means coupling another of said movable parts to the second mentioned rotary means to turn therewith, and means coupling the third of said movable parts to said tool to turn therewith.

4. A machine for grinding helically arranged and circumferentially relieved surfaces on tools having a rotary axis, said machine including a grinding wheel, means for holding a tool to be ground, means mounting said tool for movement relatively to said grinding wheel in a direction approximately axially of the tool, in a direction rotating around the axis of said tool, and also in a direction laterally of the axis of said tool to bring said axis closer to or farther away from said grinding wheel, planetary gearing including two sun gears and a planet gear interposed between and meshing with both of said sun gears and a rotatable member on which said planet gear is mounted, means operatively connecting one of said sun gears to said tool mounting means so that said one of said sun gears turns with the rotational movement of said tool, means operatively connecting the other of said sun gears to one of said rotary means to turn therewith, and means operatively connecting said rotatable member to the other of said rotary means to turn therewith.

5. A construction as described in claim 4, further including releasable means for locking said rotatable member against rotation.

6. A construction as described in claim 4, further including worm gear teeth associated with said rotatable member, and a worm pivotally mounted for swinging movement into or out of meshing engagement with said gear teeth.

7. A machine for grinding helically arranged and circumferentially relieved surfaces on tools having a rotary axis, said machine including a grinding wheel, means for holding a tool to be ground, means mounting said tool for movement relatively to said grinding wheel in a direction approximately axially of the tool, in a direction rotating around the axis of said tool, and also in a direction laterally of the axis of said tool to bring said axis closer to or farther away from said grinding wheel, rotary means carried by said tool mounting means turned in response to movement of said tool in said approximately axial direction, a track extending in a general direction approximately axially of the tool, a second rotary means carried by said tool mounting means, movable bodily along said stationary track in the direction axially of the tool, and being thereby adjustably displaced in the direction laterally of the tool axis to control the movements of said tool in said direction laterally of the axis thereof, said track being adjustable in a direction transverse to the axis of said tool, and means for selectively coupling either of said rotary means at will to the rotary motion of said tool to cause the selected rotary means and the tool to turn in synchronism with each other.

KURT ZWICK.